US009643826B2

(12) United States Patent
Kaneko et al.

(10) Patent No.: US 9,643,826 B2
(45) Date of Patent: May 9, 2017

(54) FORKLIFT AND METHOD FOR CONTROLLING FORKLIFT

(71) Applicant: Komatsu Ltd., Tokyo (JP)

(72) Inventors: Shinji Kaneko, Oyama (JP); Taishi Oiwa, Naka-gun (JP); Yoshio Yokouchi, Oyama (JP); Hideyuki Hiraiwa, Tochigi (JP); Hiroshi Yamamoto, Oyama (JP)

(73) Assignee: Komatsu Ltd., Tokyo (JP)

( * ) Notice: Subject to any disclaimer, the term of this patent is extended or adjusted under 35 U.S.C. 154(b) by 120 days.

(21) Appl. No.: 14/427,818

(22) PCT Filed: Sep. 18, 2014

(86) PCT No.: PCT/JP2014/074751
§ 371 (c)(1),
(2) Date: Mar. 12, 2015

(87) PCT Pub. No.: WO2015/186267
PCT Pub. Date: Dec. 10, 2015

(65) Prior Publication Data
US 2016/0257540 A1 Sep. 8, 2016

(51) Int. Cl.
*G06F 7/70* (2006.01)
*G06F 19/00* (2011.01)
(Continued)

(52) U.S. Cl.
CPC ............ *B66F 9/07572* (2013.01); *B66F 9/20* (2013.01); *B66F 9/22* (2013.01); *E02F 9/2246* (2013.01);
(Continued)

(58) Field of Classification Search
CPC .......... B66F 9/20; B66F 9/22; B66F 9/07572; B60R 2021/0079; E02F 9/2246
(Continued)

(56) References Cited

U.S. PATENT DOCUMENTS 7,049,883 B2 5/2006 Makino et al.
7,979,183 B2 7/2011 Toda
(Continued)

FOREIGN PATENT DOCUMENTS

CN 101861455 A 10/2010
CN 102037225 A 4/2011
(Continued)

OTHER PUBLICATIONS

International Search Report and Written Opinion dated Dec. 2, 2014, issued for PCT/JP2014/074751.

*Primary Examiner* — Isaac Smith
(74) *Attorney, Agent, or Firm* — Locke Lord LLP

(57) ABSTRACT

A forklift includes a hydraulic pump being a variable displacement pump driven by an engine, a hydraulic motor driven with fluid from the pump, a storage storing first and second groups, and a predetermined lift pressure setting value, the first group including output characteristics each representing relation between a rotational speed of the engine and a torque of the engine for each lift pressures, the second group including output characteristics each representing relation between the rotational speed and the torque for each pump pressures, and determining a greater one of first and second torques as a target torque of the engine, the first torque being calculated from one selected from the first group using the lift pressure setting value or an actual lift pressure and the rotational speed, the second torque being calculated from one selected from the second group using the pump pressure and the rotational speed.

6 Claims, 5 Drawing Sheets

(51) Int. Cl.

| | |
|---|---|
| ***G06G 7/00*** | (2006.01) |
| ***B66F 9/075*** | (2006.01) |
| ***E02F 9/22*** | (2006.01) |
| ***B66F 9/20*** | (2006.01) |
| ***F02D 29/04*** | (2006.01) |
| ***B66F 9/22*** | (2006.01) |
| ***F02D 29/02*** | (2006.01) |
| ***F02D 41/10*** | (2006.01) |
| ***F02D 41/30*** | (2006.01) |
| *B66F 9/07* | (2006.01) |

(52) U.S. Cl.
CPC ............. *F02D 29/02* (2013.01); *F02D 29/04* (2013.01); *F02D 41/10* (2013.01); *F02D 41/3005* (2013.01); *B66F 9/07* (2013.01)

(58) Field of Classification Search
USPC .................................... 701/50; 187/222, 223
See application file for complete search history.

(56) References Cited

U.S. PATENT DOCUMENTS

| | | | | |
|---|---|---|---|---|
| 8,010,260 | B2 | 8/2011 | Toda | |
| 8,428,833 | B2 | 4/2013 | Toda | |
| 8,447,477 | B2 * | 5/2013 | Harada | B66F 9/20 123/350 |
| 8,532,884 | B2 | 9/2013 | Saito et al. | |
| 8,695,566 | B2 | 4/2014 | Kawaguchi et al. | |
| 8,768,582 | B2 | 7/2014 | Toda | |
| 8,789,644 | B2 | 7/2014 | Shirao et al. | |
| 2004/0174209 | A1 | 9/2004 | Makino et al. | |
| 2006/0276948 | A1 | 12/2006 | Toda | |
| 2010/0324788 | A1 | 12/2010 | Toda | |
| 2011/0010058 | A1 | 1/2011 | Saito et al. | |
| 2011/0167811 | A1 | 7/2011 | Kawaguchi et al. | |
| 2011/0231070 | A1 | 9/2011 | Toda | |
| 2011/0276238 | A1 | 11/2011 | Toda | |
| 2011/0308879 | A1 | 12/2011 | Shirao et al. | |
| 2013/0073152 | A1 | 3/2013 | Harada et al. | |
| 2013/0118160 | A1 | 5/2013 | Toda | |

FOREIGN PATENT DOCUMENTS

| | | | |
|---|---|---|---|
| CN | 102341625 | A | 2/2012 |
| DE | 102004010356 | A1 | 10/2004 |
| DE | 102010021352 | A1 | 11/2011 |
| DE | 112011103062 | T5 | 6/2013 |
| JP | 2009-057822 | A | 3/2009 |
| JP | 2009-074405 | A | 4/2009 |
| JP | 2010-223416 | A | 10/2010 |
| JP | 2012-056763 | A | 3/2012 |
| WO | 2005/024208 | A1 | 3/2005 |
| WO | WO-2009/116250 | A1 | 9/2009 |

* cited by examiner

FORKLIFT AND METHOD FOR CONTROLLING FORKLIFT

FIELD

The present invention relates to a forklift including a variable displacement hydraulic pump driven by an engine and a hydraulic motor, which is driven with working fluid discharged from the hydraulic pump, provided to constitute a closed circuit between the hydraulic pump, and a method for controlling the forklift.

BACKGROUND

A forklift includes a hydraulic driving apparatus called hydro static transmission (HST) provided between an engine, or a driving source, and driving wheels. The HST includes, in a closed main hydraulic circuit thereof, a travel hydraulic pump which is a variable displacement pump driven by the engine and a hydraulic motor which is a variable displacement motor driven with working fluid discharged from the travel hydraulic pump. The vehicle travels by the driving force of the hydraulic motor transmitted to the driving wheel. An engine controlling apparatus of a forklift including the HST is described in Patent Literature 1.

CITATION LIST

Patent Literature

Patent Literature 1: Japanese Laid-open Patent Publication No. 2012-56763

SUMMARY

Technical Problem

The engine controlling apparatus described in Patent Literature 1 includes a weight measuring unit which measures the weight of an attachment and a load mounted on the attachment. The engine controlling apparatus has a threshold to select at least two maximum torque curves for the weight measured by the weight measuring unit. When the weight measured by the weight measuring unit is smaller than the threshold, the maximum torque curve with a smaller maximum torque is selected, and when the weight measured by the weight measuring unit is same as, or greater than, the threshold, the maximum torque curve with a greater maximum torque is selected.

The engine controlling apparatus described in Patent Literature 1 selects the maximum torque curve according to the weight of a load mounted on the attachment, so that when the load is light, even in a situation when greater engine torque is required, for example, when climbing up a slope, the maximum torque curve may not be switched to the one with a greater maximum torque. Consequently, the engine controlling apparatus described in Patent Literature 1 may result in lack of acceleration in a situation when greater engine torque is required.

A purpose of the present invention is to control an engine of a forklift including the HST so as to suppress occurrence of lack of acceleration in a situation when greater engine torque is required.

Solution to Problem

According to the present invention, a forklift comprises: an engine; a travel hydraulic pump which is a variable displacement pump driven by the engine; a hydraulic motor which forms a closed circuit with the travel hydraulic pump and is driven with working fluid discharged from the travel hydraulic pump; a driving wheel driven by the hydraulic motor; a lift pressure detecting device which detects lift pressure in a lift cylinder which raises or lowers a fork for mounting a load; a pump pressure detecting device which detects a pump pressure that is a pressure of working fluid discharged from the travel hydraulic pump; a storage unit which stores a first output characteristic group, a second output characteristic group, and a predetermined lift pressure setting value, the first output characteristic group including a plurality of output characteristics each of which represents a relation between a rotational speed of the engine and a torque generated in the engine for each of a plurality of lift pressures, the second output characteristic group including a plurality of output characteristics each of which represents a relation between the rotational speed and the torque for each of a plurality of pump pressures; and a control device which determines a greater one of a first target torque and a second target torque as a target torque of the engine, the first target torque being calculated from an output characteristic selected from the first output characteristic group, using the lift pressure setting value or an actual lift pressure detected by the lift pressure detecting device, and the rotational speed of the engine, the second target torque being calculated from an output characteristic selected from the second output characteristic group, using the pump pressure, and the rotational speed of the engine.

In the present invention, it is preferable that the control device selects an output characteristic from the first output characteristic group using a value obtained by processing the actual lift pressure to moderate changes in the actual lift pressure.

In the present invention, it is preferable that the control device determines, as the target torque of the engine, a greater one of the first target torque and a value obtained by modulating the second target torque.

In the present invention, it is preferable that the forklift further comprises: an accelerator operation unit which operates an amount of fuel supplied to the engine to increase or decrease; a selecting switch which switches between forward travel and rearward travel of a forklift; and a brake operation unit which performs braking of the forklift, wherein the storage unit stores at least the two lift pressure setting values, the control device detects each controlling state of the selecting switch, the brake operation unit, and the accelerator operation unit to determine whether the forklift is in a loading operation state, the control device then selects a higher one from at least the two lift pressure setting values when a state is determined as the loading operation state, or selects a lower one from at least the two lift pressure setting values when a state is not determined as the loading operation state, and the control device then selects the output characteristic from the first output characteristic group using a lower one of the selected lift pressure setting value and the actual lift pressure.

In the present invention, it is preferable that when a temperature of working fluid in the closed circuit exceeds a threshold value, the control device determines, as the target torque of the engine, a smaller one of both a third target torque and a greater one of both the first target torque and the second target torque, the third target torque being calculated by applying the rotational speed of the engine to an output characteristic including a portion which determines a torque smaller than a torque determined by an output characteristic representing a relation between the rotational speed of the engine and a maximum torque generated in the engine.

According to the present invention, a method for controlling a forklift, the forklift including an engine, a travel hydraulic pump which is a variable displacement pump driven by the engine, a hydraulic motor which forms a closed circuit with the travel hydraulic pump and is driven with working fluid discharged from the travel hydraulic pump, a driving wheel driven by the hydraulic motor, a lift pressure detecting device which detects lift pressure in a lift cylinder which raises or lowers a fork for mounting a load, and a pump pressure detecting device which detects a pump pressure that is a pressure of working fluid discharged from the travel hydraulic pump, the method comprises: calculating a first target torque from an output characteristic and the rotational speed of the engine, the output characteristic being selected from a first output characteristic group using a predetermined lift pressure setting value or an actual lift pressure detected by the lift pressure detecting device, the first output characteristic group including a plurality of output characteristics each of which represents a relation between the rotational speed of the engine and a torque generated in the engine for each of a plurality of lift pressures; calculating a second target torque from an output characteristic and the rotational speed of the engine, the output characteristic being selected from a second output characteristic group using the pump pressure, the second output characteristic group including a plurality of output characteristics each of which represents a relation between the rotational speed and the torque for each of a plurality of pump pressures; and determining a greater one of the first target torque and the second target torque as a target torque of the engine.

The present invention controls an engine of a forklift including the HST so as to suppress occurrence of the lack of acceleration in a situation when greater engine torque is required.

DESCRIPTION OF EMBODIMENTS

An embodiment for carrying out the present invention will be described referring to the attached drawings.

<Forklift>

Figure 1:
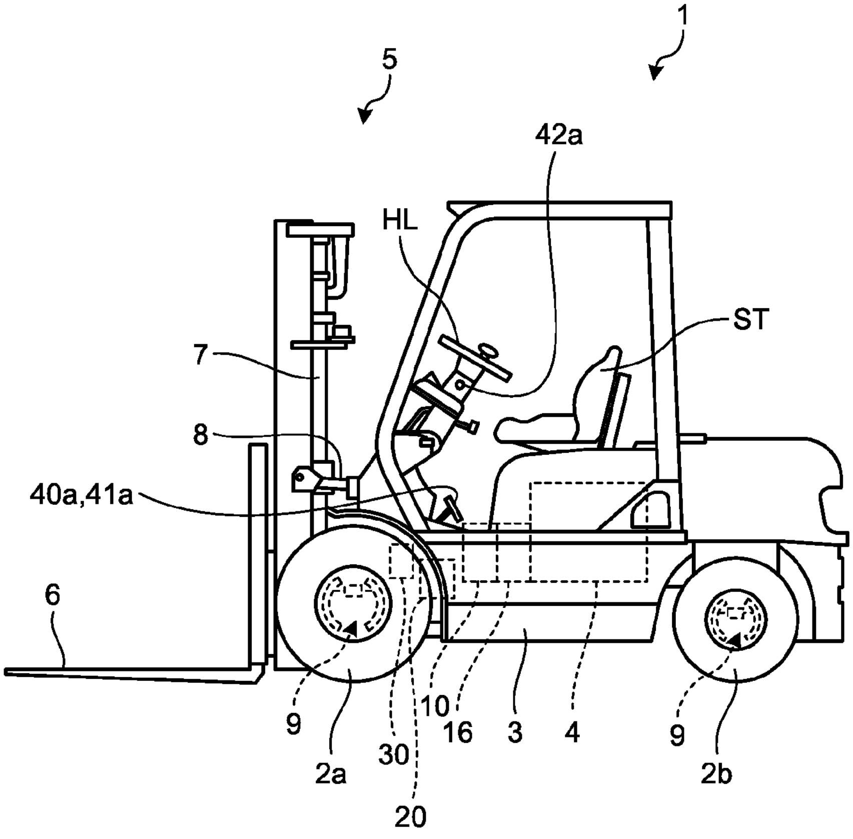
FIG. 1 illustrates an overall configuration of a forklift according to the embodiment.
Figure 2:
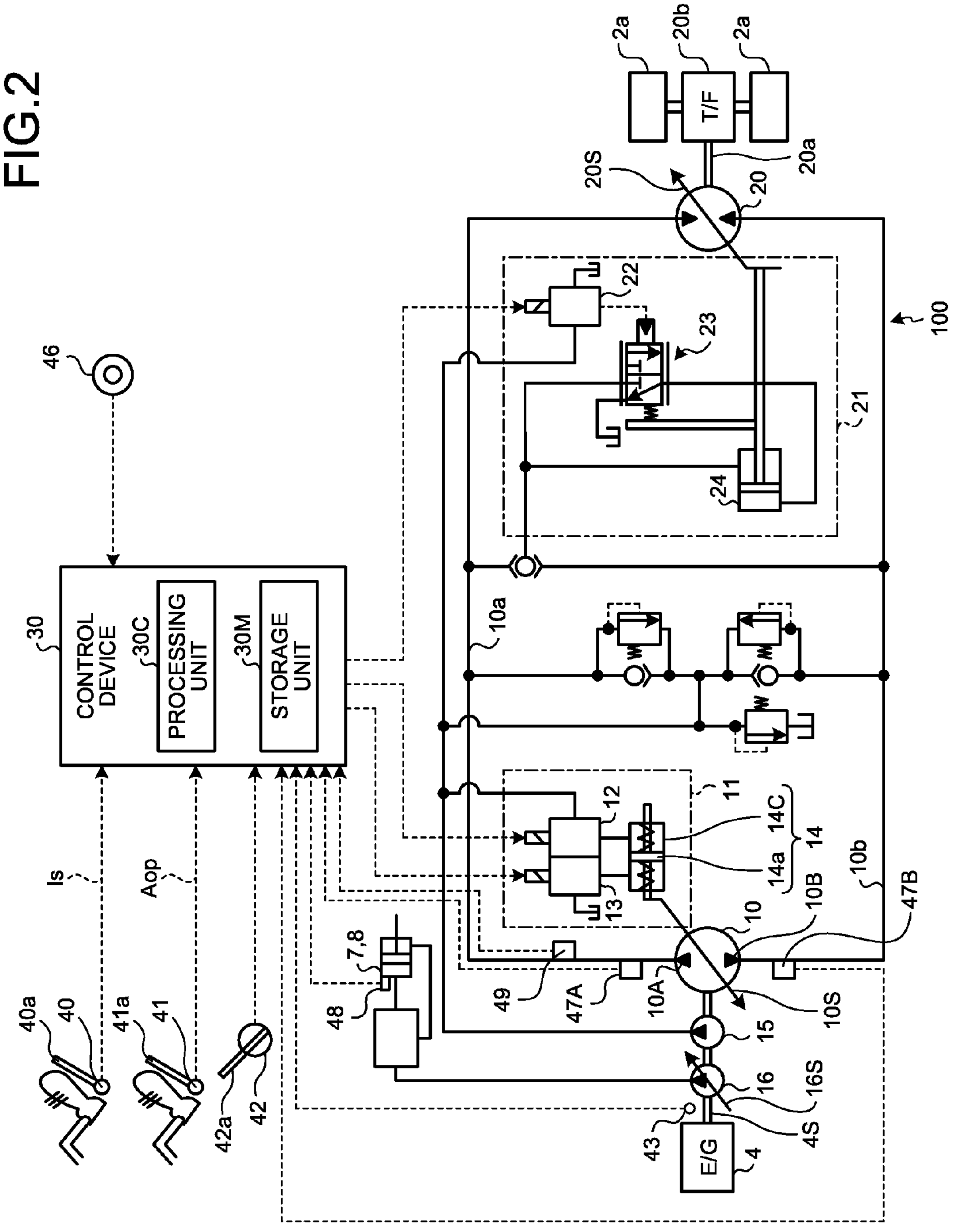
FIG. 2 is a block diagram illustrating a control system of the forklift illustrated in FIG. 1.

FIG. 1 illustrates an overall configuration of a forklift 1 according to the embodiment. FIG. 2 is a block diagram illustrating a control system of the forklift 1 illustrated in FIG. 1. The forklift 1 includes a vehicle body 3 having driving wheels 2*a* and steering wheels 2*b*, work machine 5, and a mechanical brake 9 which brakes the driving wheels 2*a* and the steering wheels 2*b*. The portion of the forklift 1 from the driver's seat ST toward the steering member HL is the forward portion, and the portion of the forklift 1 from the steering member HL to the driver's seat ST is the rearward portion. The work machine 5 is provided in the forward side of the vehicle body 3.

The vehicle body 3 is provided with an engine 4 which is an internal combustion engine, a travel hydraulic pump 10 which is a variable displacement pump, and a work machine hydraulic pump 16, both the travel hydraulic pump 10 and the work machine hydraulic pump 16 being driven by the engine 4. The engine 4 is, for example, a diesel engine. However, the engine 4 is not limited to a diesel engine. The travel hydraulic pump 10 and the work machine hydraulic pump 16 are coupled to an output shaft 4S of the engine 4. The travel hydraulic pump 10 and the work machine hydraulic pump 16 are driven by the engine 4 via the output shaft 4S. The driving wheels 2*a* are driven by a driving force of a hydraulic motor 20. The variable displacement travel hydraulic pump 10 and the variable displacement hydraulic motor 20 communicate through a closed hydraulic circuit to constitute an HST. The forklift 1 thus travels by the HST. In the embodiment, the travel hydraulic pump 10 and the work machine hydraulic pump 16 include a swash plate 10S and a swash plate 16S, respectively, each of which changes the capacity by varying the tilt angle thereof.

The work machine 5 includes a lift cylinder 7 which raises and lowers a fork 6 for carrying a load and a tilt cylinder 8 which tilts the fork 6. Provided in the driver's seat of the vehicle body 3 are a forward/rearward travel lever 42*a*, an inching pedal (brake pedal) 40*a* as a brake operation unit, an accelerator pedal 41*a* as an accelerator operation unit, and a work machine operating lever (not illustrated) including a lifting lever and a tilting lever for operating the work machine 5. The inching pedal 40*a* is used to control the inching rate. The accelerator pedal 41*a* is used to change the amount of supply fuel to the engine 4. The inching pedal 40*a* and the accelerator pedal 41*a* are located so as to be operated by a foot of an operator in a driver's seat. In FIG. 1, the inching pedal 40*a* and the accelerator pedal 41*a* are overlappingly illustrated.

As illustrated in FIG. 2, the forklift 1 includes a main hydraulic circuit 100. The main hydraulic circuit 100 is a closed circuit including the travel hydraulic pump 10, the hydraulic motor 20, and hydraulic supply tubes 10*a* and 10*b* connecting the travel hydraulic pump 10 with the hydraulic motor 20. The travel hydraulic pump 10 is a device driven by the engine 4 to discharge working fluid. In the embodiment, the travel hydraulic pump 10 is, for example, a variable displacement pump of which capacity can be changed by changing the swash plate tilt angle.

The hydraulic motor 20 is rotatably driven with the working fluid discharged from the travel hydraulic pump 10. The hydraulic motor 20 is, for example, a variable displacement hydraulic motor including a swash plate 20S, of which tilt angle can be change to change the capacity of the motor. The hydraulic motor 20 may be a fixed displacement hydraulic motor. An output shaft 20*a* of the hydraulic motor 20 is connected to the driving wheels 2*a* via a transfer 20*b*. The hydraulic motor 20 rotatably drives the driving wheels 2*a* via the transfer 20*b* to make the forklift 1 travel.

The rotational direction of the hydraulic motor 20 can be switched according to the direction of the working fluid supplied from the travel hydraulic pump 10. By switching the rotational direction of the hydraulic motor 20, the forklift 1 travels forward or rearward. Hereinafter, for convenience of description, the forklift 1 travels forward when the working fluid is supplied to the hydraulic motor 20 from the hydraulic supply tube 10*a*, and the forklift 1 travels rearward when the working fluid is supplied to the hydraulic motor 20 from the hydraulic supply tube 10*b*.

The travel hydraulic pump 10 has an A-port 10A connected to the hydraulic supply tube 10*a* and a B-port 10B connected to the hydraulic supply tube 10*b*. When the forklift 1 travels forward, the A-port 10A will be the discharge side of working fluid and the B-port 10B will be the inflow side of working fluid. When the forklift 1 travels rearward, the A-port 10A will be the inflow side of working fluid and the B-port 10B will be the discharge side of working fluid.

The forklift 1 includes a pump capacity setting unit 11, a motor capacity setting unit 21, and a charge pump 15. The pump capacity setting unit 11 is provided on the travel hydraulic pump 10. The pump capacity setting unit 11 includes a forward travel pump electromagnetic proportional control valve 12, an rearward travel pump electromagnetic proportional control valve 13, and a pump capacity control cylinder 14. The forward travel pump electromagnetic proportional control valve 12 and the rearward travel pump electromagnetic proportional control valve 13 in the pump capacity setting unit 11 receive a command signal from a control device 30 which will be described later. The pump capacity control cylinder 14 in the pump capacity setting unit 11 operates according to the command signal sent from the control device 30 to change the swash plate tilt angle of the travel hydraulic pump 10, thereby changing the capacity of the travel hydraulic pump 10.

The pump capacity control cylinder 14 has a piston 14*a* contained in a cylinder case 14C. The piston 14*a* reciprocates in the cylinder case 14C with the working fluid supplied in a space between the cylinder case 14C and the piston 14*a*. When the swash plate tilt angle is zero, the piston 14*a* is held in a neutral position in the pump capacity control cylinder 14. So that, even when the engine 4 rotates, the amount of working fluid discharged from the travel hydraulic pump 10 to the hydraulic supply tube 10*a* or the hydraulic supply tube 10*b* of the main hydraulic circuit 100 is zero.

Now, from the state where the travel hydraulic pump 10 has zero swash plate tilt angle, for example, a command signal is sent from the control device 30 to the forward travel pump electromagnetic proportional control valve 12 to increase the capacity of the travel hydraulic pump 10. According to the command signal, the forward travel pump electromagnetic proportional control valve 12 supplies pump control pressure to the pump capacity control cylinder 14. The piston 14*a* accordingly moves to the left in FIG. 2. When the piston 14*a* in the pump capacity control cylinder 14 moves to the left in FIG. 2, a swash plate 10S in the travel hydraulic pump 10 tilts toward the direction to discharge working fluid to the hydraulic supply tube 10*a* in response to the motion of the piston 14*a*.

As the pump control pressure supplied by the forward travel pump electromagnetic proportional control valve 12 increases, the displacement of the piston 14*a* increases. Accordingly, the change in tilt angle of the swash plate 10S in the travel hydraulic pump 10 also increases. That is, when the control device 30 sends the command signal to the forward travel pump electromagnetic proportional control valve 12, the forward travel pump electromagnetic proportional control valve 12 supplies pump control pressure to the pump capacity control cylinder 14 according to the command signal. By the pump capacity control cylinder 14 operating with the pump control pressure, the swash plate 10S in the travel hydraulic pump 10 tilts to discharge a predetermined amount of working fluid to the hydraulic supply tube 10*a*. Then, when the engine 4 rotates, the travel hydraulic pump 10 discharges working fluid to the hydraulic supply tube 10*a* to rotate the hydraulic motor 20 in the forward direction.

In the abovementioned state, when the control device 30 sends a command signal to the forward travel pump electromagnetic proportional control valve 12 to reduce the capacity of the travel hydraulic pump 10, the pump control pressure supplied to the pump capacity control cylinder 14 from the forward travel pump electromagnetic proportional control valve 12 decreases according to the command signal. Accordingly, the piston 14*a* in the pump capacity control cylinder 14 moves toward the neutral position. As a result, the swash plate tilt angle of the travel hydraulic pump 10 decreases and thereby the amount of working fluid discharged from the travel hydraulic pump 10 to the hydraulic supply tube 10*a* decreases.

When the control device 30 sends a command signal to the rearward travel pump electromagnetic proportional control valve 13 to increase the capacity of the travel hydraulic pump 10, the rearward travel pump electromagnetic proportional control valve 13 supplies pump control pressure to the pump capacity control cylinder 14 according to the command signal. The piston 14*a* then moves to the right in FIG. 2. By the piston 14*a* in the pump capacity control cylinder 14 moving to the right in FIG. 2, the swash plate 10S in the travel hydraulic pump 10 tilts toward the direction to discharge working fluid to the hydraulic supply tube 10*b* in response to the motion of the piston 14*a*.

As the pump control pressure supplied by the rearward travel pump electromagnetic proportional control valve 13 increases, the displacement of the piston 14*a* increases and thereby the change in swash plate tilt angle in the travel hydraulic pump 10 increases. That is, when the control device 30 sends the command signal to the rearward travel pump electromagnetic proportional control valve 13, the rearward travel pump electromagnetic proportional control valve 13 supplies pump control pressure to the pump capacity control cylinder 14 according to the command signal. By operating the pump capacity control cylinder 14, the swash plate 10S in the travel hydraulic pump 10 tilts to discharge a desired amount of working fluid to the hydraulic supply tube 10*b*. Then, when the engine 4 rotates, the travel hydraulic pump 10 discharges working fluid to the hydraulic supply tube 10*b* to rotate the hydraulic motor 20 in the rearward direction.

When the control device 30 sends a command signal to the rearward travel pump electromagnetic proportional control valve 13 to reduce the capacity of the travel hydraulic pump 10, the pump control pressure supplied to the pump capacity control cylinder 14 from the rearward travel pump electromagnetic proportional control valve 13 decreases and thereby the piston 14*a* moves toward the neutral position. As a result, the swash plate tilt angle in the travel hydraulic pump 10 decreases and thereby the amount of working fluid discharged from the travel hydraulic pump 10 to the hydraulic supply tube 10*b* decreases.

The motor capacity setting unit 21 is provided on the hydraulic motor 20. The motor capacity setting unit 21 includes a motor electromagnetic proportional control valve 22, a motor cylinder control valve 23, and a motor capacity control cylinder 24. When the control device 30 sends a command signal to the motor electromagnetic proportional control valve 22 in the motor capacity setting unit 21, the motor electromagnetic proportional control valve 22 supplies motor control pressure to the motor cylinder control valve 23 to operate the motor capacity control cylinder 24. By operating the motor capacity control cylinder 24, the swash plate tilt angle in the hydraulic motor 20 changes in response to the motion of the motor capacity control cylinder 24. The capacity of the hydraulic motor 20 thereby changes according to the command signal sent from the control device 30. Specifically, the motor capacity setting unit 21 is configured to decrease the swash plate tilt angle in the hydraulic motor 20 as the motor control pressure supplied from the motor electromagnetic proportional control valve 22 increases.

The charge pump 15 is driven by the engine 4. The charge pump 15 supplies pump control pressure to the pump capacity control cylinder 14 via the forward travel pump electromagnetic proportional control valve 12 and the rearward travel pump electromagnetic proportional control valve 13. The charge pump 15 supplies motor control pressure to the motor cylinder control valve 23 via the motor electromagnetic proportional control valve 22.

In the embodiment, the engine 4 drives the travel hydraulic pump 10 and also the work machine hydraulic pump 16. The work machine hydraulic pump 16 supplies working fluid to the lift cylinder 7 and the tilt cylinder 8, which are work actuators to drive the work machine 5.

The forklift 1 includes an inching potentiometer (braking potentiometer) 40, an accelerator potentiometer 41, a forward/rearward travel lever switch 42, an engine speed sensor 43, a vehicle speed sensor 46, pressure sensors 47A and 47B, a pressure sensor 48, and a temperature sensor 49.

The inching potentiometer 40 detects and outputs the operation-amount of the inching pedal (brake pedal) 40*a* when the inching pedal 40*a* is controlled. The operation-amount of the inching pedal 40*a* is referred to as inching operation-amount Is. The inching operation-amount is output from the inching potentiometer 40 and input to the control device 30. Hereinafter, the inching operation-amount Is also referred to as inching stroke Is.

The accelerator potentiometer 41 outputs an operation-amount Aop of the accelerator pedal 41*a* when the accelerator pedal 41*a* is controlled. The operation-amount Aop of the accelerator pedal 41*a* is also referred to as accelerator position Aop. The accelerator position Aop output from the accelerator potentiometer 41 is input to the control device 30.

The forward/rearward travel lever switch 42 is used to switch the travel directions of the forklift 1. In the embodiment, the forward/rearward travel lever switch 42 is provided to switch between forward travel and rearward travel of the forklift 1, by selecting one of three travel directions, that is, forward travel, neutral, or rearward travel using the forward/rearward travel lever 42*a* provided in a position where a driver can selectively manipulate from the driver's seat. The information of travel direction of the forklift 1 selected with the forward/rearward travel lever switch 42 is sent to the control device 30 as selection information. The travel direction selected with the forward/rearward travel lever switch 42 includes both the direction in which the forklift 1 travels and the direction in which the forklift 1 is actually traveling.

The engine speed sensor 43 detects the actual rotational speed of the engine 4. The engine speed sensor 43 detects the rotational speed of the engine 4 as an actual engine rotational speed Nr. The information indicating the actual engine rotational speed Nr is input to the control device 30. The rotational speed of the engine 4 is the engine speed per a unit time of the output shaft 4S of the engine 4. The vehicle speed sensor 46 is a device which detects the traveling speed of the forklift 1, that is, an actual vehicle speed Vc.

The pressure sensor 47A is provided on the hydraulic supply tube 10*a* to detect the pressure of working fluid in the hydraulic supply tube 10*a*. The pressure sensor 47B is provided on the hydraulic supply tube 10*b* to detect the pressure of working fluid in the hydraulic supply tube 10*b*. The pressure sensor 47A detects the pressure of working fluid in the A-port 10A of the travel hydraulic pump 10. The pressure sensor 47B detects the pressure of working fluid in the B-port 10B of the travel hydraulic pump 10. The control device 30 obtains the values detected by the pressure sensor 47A and the pressure sensor 47B and uses the detected values to control the work vehicle according to the embodiment. The pressure sensor 48 is a lift pressure detecting device which detects the lift pressure in the lift cylinder 7, that is, the pressure of working fluid in the lift cylinder 7. The temperature sensor 49 is a temperature detecting unit which detects the temperature of working fluid in the HST.

The control device 30 includes a processing unit 30C and a storage unit 30M. The control device 30 includes, for example, a computer to execute various types of processing to control the forklift 1. The processing unit 30C is a combined device configured with, for example, a central processing unit (CPU) and a memory. The processing unit 30C reads a computer program, stored in the storage unit 30M, for controlling the main hydraulic circuit 100 to execute a command written in the computer program so as to control the main hydraulic circuit 100. The storage unit 30M stores the computer program and data used for controlling the main hydraulic circuit 100. The storage unit 30M is, for example, a read only memory (ROM), a storage device, or a combined device thereof.

In the control device 30, various sensors such as the inching potentiometer 40, the accelerator potentiometer 41, the forward/rearward travel lever switch 42, the engine speed sensor 43, the vehicle speed sensor 46, and the pressure sensors 47A and 47B are electrically connected. Based on input signals from these sensors, the control device 30 generates command signals for the forward travel pump electromagnetic proportional control valve 12 and the rearward travel pump electromagnetic proportional control valve 13 and sends the generated command signals to the electromagnetic proportional control valves 12, 13, and 22.

<Control Block of Control device 30>

Figure 3:
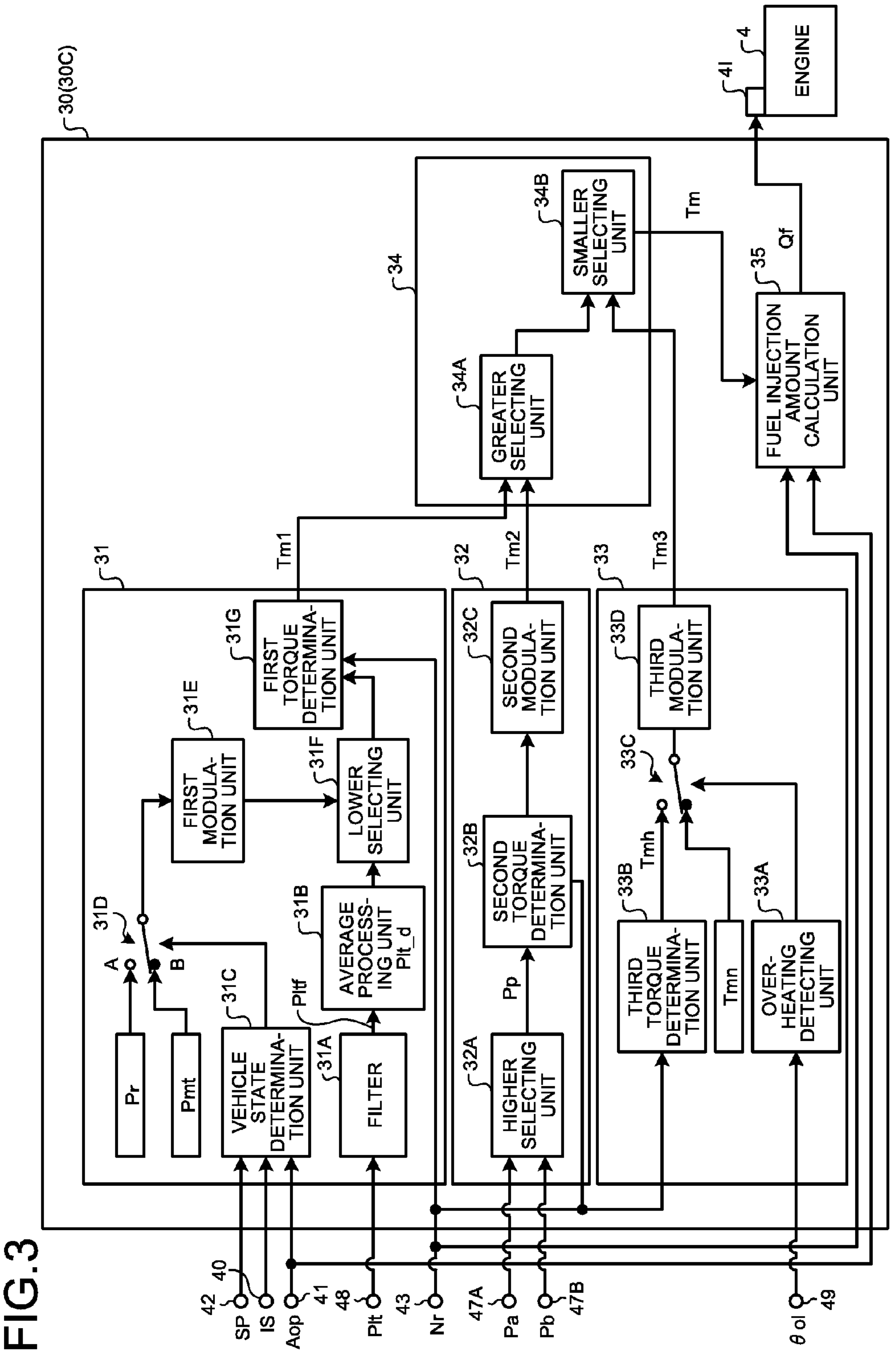
FIG. 3 illustrates a control block diagram of a control device.

FIG. 3 illustrates a control block diagram of the control device 30. The control device 30, more specifically, the processing unit 30C carries out a method for controlling the forklift 1 according to the embodiment. As illustrated in FIG. 3, the processing unit 30C in the control device 30 includes a first target torque calculation unit 31, a second target torque calculation unit 32, a third target torque calculation unit, and a target torque decision unit 34. The first target torque calculation unit 31, the second target torque calculation unit 32, and a third target torque calculation unit 33 calculate a target value of the torque generated in the engine 4, that is, a target torque Tm of the engine 4.

The first target torque calculation unit 31 calculates a target torque Tm1 based on the lift pressure of the forklift 1. The target torque Tm1 calculated by the first target torque calculation unit 31 is referred to as first target torque Tm1 as required. The second target torque calculation unit 32 calculates a target torque Tm2 based on the load on the HST included in the forklift 1, where the HST is the transmission configured with a closed hydraulic circuit in which the travel hydraulic pump 10 and the hydraulic motor 20 are connected with the hydraulic supply tube 10*a* and the hydraulic supply tube 10*b*. The target torque Tm2 calculated by the second target torque calculation unit 32 is referred to as second target torque Tm2 as required. The third target torque calculation unit 33 calculates a target torque Tm3 which is used in a state when the HST included in the forklift 1 is determined to be overheating. The target torque Tm3 calculated by the third target torque calculation unit 33 is referred to as third target torque Tm3 as required.

The target torque decision unit 34 selects the target torque Tm from the first target torque Tm1, the second target torque Tm2, and the third target torque Tm3. The control device 30 in the embodiment includes a fuel injection amount calculation unit 35. The fuel injection amount calculation unit 35 calculates a fuel injection amount Qf in the engine 4 from the actual engine rotational speed Nr and the target torque Tm. To drive the engine 4, the control device 30 supplies fuel to the engine 4 so as the injection amount of fuel to be the fuel injection amount Qf calculated in the fuel injection amount calculation unit 35.

(First Target Torque Calculation Unit 31)

As illustrated in FIG. 3, the first target torque calculation unit 31 includes a filter 31A, an average processing unit 31B, a vehicle state determination unit 31C, a selecting unit 31D, a first modulation unit 31E, a lower selecting unit 31F, and a first torque decision unit 31G. The pressure sensor 48 inputs an actual lift pressure Plt to the filter 31A. The actual lift pressure Plt represents a load mounted on the fork 6. The control device 30 can determine the load on the fork 6 from the actual lift pressure Plt.

The filter 31A performs a filter processing to the actual lift pressure Plt obtained by the pressure sensor 48 and outputs the resulting filtered value. The filter 31A is a first-order lag filter which receives the actual lift pressure Plt obtained by the pressure sensor 48 as an input value and outputs an output value Pltf passing through the filter 31A. The output value Pltf is expressed by, for example, Equation (1). The parameter "f" in Equation (1) represents a cutoff frequency and can be set to, for example, 1 Hz or lower. Δt represents a control period of the control device 30, and Plftb is an output value of the filter 31A output in an immediately preceding control period.

$$Pltf=Plt\times 2\times\pi f\times\Delta t/(2\times\pi\times f\times\Delta t+1)+Pltfb/\ (2\times\pi\times f\times\Delta t+1) \quad (1)$$

The average processing unit 31B averages a plurality of output values Pltf from the filter 31A and outputs the averaged result to the lower selecting unit 31F. The average processing unit 31B stores an initial value Plt_d. When the filter 31A gives no input, the average processing unit 31B outputs the initial value Plt_d to the lower selecting unit 31F.

The vehicle state determination unit 31C determines a control state of the forklift 1. The vehicle state determination unit 31C determines the state of the forklift 1 as state A or state B. In state A, the forklift 1 is performing simple loading or travel loading. The state A is referred to as loading operation state. In state B, the forklift 1 is traveling or performing no operation. The load on the forklift 1 is heavier in state A than in state B. The vehicle state determination unit 31C determines that the forklift 1 is in state A when condition (a) or condition (b) is satisfied, and that the forklift 1 is in state B when neither of condition (a) nor condition (b) is satisfied.

Condition (a): The output SP of the forward/rearward travel lever switch 42 in neutral, and the accelerator position Aop at x% or higher.

Condition (b): The inching stroke Is at y% or higher, and the accelerator position Aop at z% or higher.

To avoid the state always being determined as simple loading of state A when operating the forward/rearward travel lever 42*a* into neutral, the state of the accelerator position Aop is added to condition (a). To avoid the state always being determined as travel loading of state A when operating the inching pedal 40*a*, the state of the accelerator position Aop is added to condition (b). The accelerator position Aop is detected by the accelerator potentiometer 41 and input to the vehicle state determination unit 31C. The inching stroke is detected by the inching potentiometer 40 and input to the vehicle state determination unit 31C. "x" of condition (a) is smaller than "z" of condition (b). "x", "y", and "z" can be of any value suitable for determining whether the forklift 1 is operating simple loading or travel loading. For example, it is determined that "x"=10, "y"=20, and "z"=40 in the embodiment.

According to the result determined in the vehicle state determination unit 31C, the selecting unit 31D selects either of a loading lift pressure Pr and a lift pressure reference value Pmt and outputs the selected one to the first modulation unit 31E. The loading lift pressure Pr is selected when the forklift 1 is in state A, and the lift pressure reference value Pmt is selected when the forklift 1 is in state B. The loading lift pressure Pr and the lift pressure reference value Pmt are lift pressure setting values. The loading lift pressure Pr and the lift pressure reference value Pmt are predetermined and stored in the storage unit 30M in the control device 30 illustrated in FIG. 2. The loading lift pressure Pr is higher than the lift pressure reference value Pmt.

The storage unit 30M may store the loading lift pressure Pr, the lift pressure reference value Pmt, and other different lift pressure setting values, which correspond to three or more states. The selecting unit 31D may select the lift pressure setting value from those corresponding to three or more states according to determination made by the vehicle state determination unit 31C, and output the selected lift pressure setting value to the first modulation unit 31E. For example, the storage unit 30M stores the loading lift pressure Pr corresponding to the loading operation state, a heavy load traveling lift pressure Plm corresponding to the traveling state with a heavy load, and the lift pressure reference value Pmt corresponding to a traveling state with a light load. The vehicle state determination unit 31C determines whether the state is in a loading operation state, a heavy load traveling state, or a light load traveling state. The loading lift pressure Pr is higher than the heavy load traveling lift pressure Plm, and the heavy load traveling lift pressure Plm is higher than the lift pressure reference value Pmt.

The loading operation state is the abovementioned state A. The abovementioned state B is further categorized into two states, that is, the heavy load traveling state and the light load traveling state. In the heavy load traveling state, for example, the output SP from the forward/rearward travel lever switch 42 indicates forward or rearward, and the accelerator position Aop is at r% or higher. In the light load traveling state, for example, the output SP from the forward/rearward travel lever switch 42 indicates forward or rearward, and the accelerator position Aop is smaller than r%. Based on the result determined in the vehicle state determination unit 31C, the selecting unit 31D selects either one of the loading lift pressure Pr, the heavy load traveling lift pressure Plm, and the lift pressure reference value Pmt and outputs the selected one to the modulation unit 31E. By providing two or more lift pressure setting values, the first target torque calculation unit 31 can calculate the first target torque Tm1 using a suitable lift pressure setting value selected from those corresponding to further large number of states of the forklift 1.

The first modulation unit 31E modulates the output from the selecting unit 31D and outputs the modulated result to the lower selecting unit 31F. The first modulation unit 31E uses limit modulation. When the output from the selecting unit 31D increases, for example, when the lift pressure reference value Pmt switches to the loading lift pressure Pr, the first modulation unit 31E increases the output from the selecting unit 31D by pressure Pi per a unit time tu. When the output from the selecting unit 31D decreases, for example, when the loading lift pressure Pr switches to the lift pressure reference value Pmt, the first modulation unit 31E decreases the output from the selecting unit 31D by pressure Pd per a unit time tu. The pressure Pi is lower than the pressure Pd. In the embodiment, the pressure Pi is about one tenth of the pressure Pd. As described above, the rising speed of pressure when increasing the output from the selecting unit 31D is set to be smaller than when decreasing the output. In this manner, sudden rise of torque in the engine 4 can preferably be suppressed when traveling and loading are simultaneously performed with a maximum load on the fork 6. When the output from the selecting unit 31D does not increase nor does decrease, the first modulation unit 31E outputs the output sent from the selecting unit 31D to the lower selecting unit 31F.

The lower selecting unit 31F selects lower one of the output from the average processing unit 31B and the output from the first modulation unit 31E and outputs the selected one to the first torque decision unit 31G. The output from the average processing unit 31B and the output from the first modulation unit 31E both represent the lift pressure. Therefore, the output from the lower selecting unit 31F represents the lift pressure. Hereinafter, the output from the lower selecting unit 31F is referred to as lower selecting unit lift pressure as required.

Figure 4:
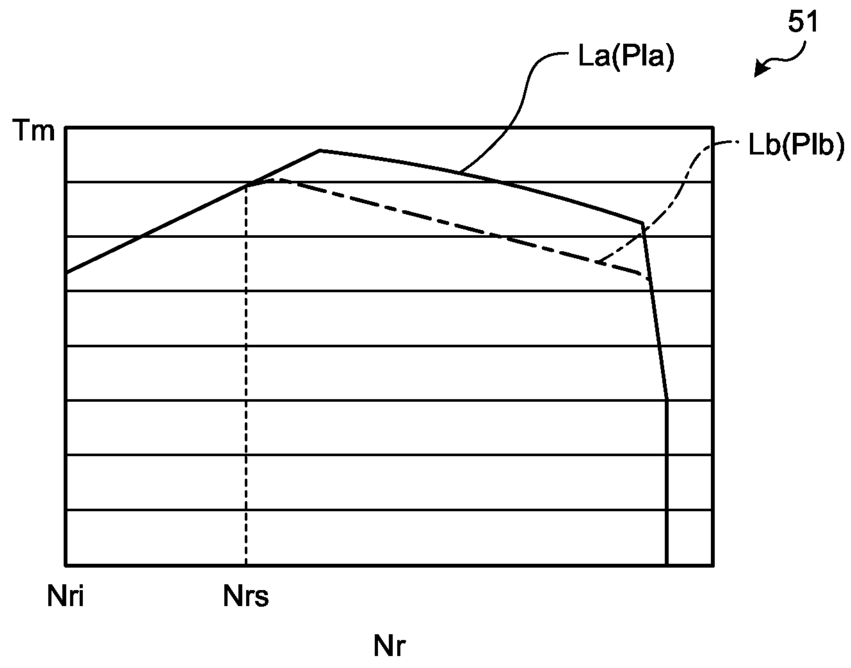
FIG. 4 illustrates a first torque selection map setting a torque curve representing the relation between an engine target torque and an actual engine rotational speed.

FIG. 4 illustrates a first torque selection map 51 setting a torque curve representing the relation between the target torque Tm of the engine 4 and the actual engine rotational speed Nr. The first torque selection map 51 sets a plurality of torque curves La and Lb. The torque curves La and Lb represent the relation between the rotational speed of the engine 4 (actual engine rotational speed Nr in the example) and a torque generated in the engine 4 (target torque Tm in the example). The torque curves La and Lb correspond to the output characteristic of the engine 4. The first torque selection map 51 includes the plurality of torque curves La and Lb. Hereinafter, the plurality of torque curves La and Lb, when not distinguished between each other, is referred to as torque curve L.

Each of the plurality of torque curves La and Lb is set corresponding to each of a plurality of lift pressures. The torque curve La corresponds to a lift pressure Pla, and the torque curve Lb corresponds to a lift pressure Plb which is lower than the lift pressure Pla. The first torque selection map 51 thus corresponds to a first output characteristic group including a plurality of output characteristics of the engine 4, each output characteristic corresponding to each of a plurality of lift pressures Pl. The first torque selection map 51 is stored in the storage unit 30M in the control device 30 illustrated in FIG. 2. The first torque selection map 51 includes two torque curves La and Lb, although the number of torque curves L may be two or more.

The torque curve La represents the relation between the maximum torque that the engine 4 can generate and the rotational speed of the engine 4. The engine 4 cannot generate a torque greater than that determined by the torque curve La. When the engine 4 is controlled according to the torque curve Lb, the maximum torque that the engine 4 can generate is limited by the torque curve Lb. From the idle rotational speed Nri to the rotational speed Nrs which is higher than the rotational speed Nri, the torque curve Lb is identical to the torque curve La. When the rotational speed is at Nrs or higher, the torque curve Lb limits the torque generated in the engine 4 to be smaller than the torque determined by the torque curve La for the same rotational speed. In the embodiment, the target torque Tm in the first torque selection map 51 is expressed in a value of ratio where the torque curve La represents the 100% value. That is, the target torque Tm decided by the first torque selection map 51 is output in percentage.

Based on the lower selecting unit lift pressure, the first torque decision unit 31G selects either one of the torque curves La and Lb set in the first torque selection map 51 illustrated in FIG. 4. The first torque decision unit 31G then decides the target torque Tm from the selected torque curve L and the actual engine rotational speed Nr and outputs the determined result to the target torque decision unit 34 as the first target torque Tm1. When there is no torque curve L corresponding to the lower selecting unit lift pressure, the first torque decision unit 31G calculates the target torque Tm corresponding to the lower selecting unit lift pressure by interpolation using a value on the torque curve La corresponding to the lift pressure Pla and a value on the torque curve Lb corresponding to the lift pressure Plb. When the lower selecting unit lift pressure is higher than the lift pressure Pla corresponding to the torque curve La, the first torque decision unit 31G calculates the target torque Tm using the torque curve La. When the lower selecting unit lift pressure is lower than the lift pressure Plb corresponding to the torque curve Lb, the first torque decision unit 31G calculates the target torque Tm using the torque curve Lb.

When the forklift 1 is traveling with a light load, the torque generated in the engine 4 is limited to be smaller than the allowed upper limit torque of the engine 4, thereby suppressing fuel consumption. When the forklift 1 is traveling with a load where the state is determined as state B, the first torque decision unit 31G calculates the first target torque Tm1 using the lower one of the lift pressure standard value Pmt, which is lower than the loading lift pressure Pr, and the actual lift pressure Plt. Since the resulting first target torque Tm1 is small, the control device 30 can reduce fuel consumption.

When the output SP from the forward/rearward travel lever switch 42 is in neutral, a speed of rising the fork 6 is required. Further, when the accelerator pedal 41*a* and the inching pedal 40*a* are operated at the same time, a certain torque is required of the engine 4 to make the forklift 1 travel. When the output SP from the forward/rearward travel lever switch 42 is in neutral or when the accelerator pedal 41*a* and the inching pedal 40*a* are operated at the same time, either of the states is state A. In state A, the first torque decision unit 31G calculates the first target torque Tm1 using the lower one of the loading lift pressure Pr, which is higher than the lift pressure reference value Pmt, and the actual lift pressure Plt. The first torque decision unit 31G can thereby decide the first target torque Tm1 using the torque curve La setting the maximum torque that the engine 4 can generate. Therefore, when a large power is required, such as in simple loading or travel loading, the control device 30 can drive the engine 4 with the maximum torque that the engine 4 can generate.

In state A when the actual lift pressure Plt is lower than the loading lift pressure Pr, the first torque decision unit 31G calculates the first target torque Tm1 using the actual lift pressure Plt. The first torque decision unit 31G can thereby decide the first target torque Tm1 using a torque curve such as the torque curve Lb including the torque smaller than that provided by the torque curve La for the same actual engine rotational speed Nr. Therefore, when the actual lift pressure Plt is small, for example, when the load is light, the engine 4 can reduce fuel consumption by suppressing the torque generated in the engine 4.

When the forklift 1 goes over a step or a hole and receives an impact during traveling, the actual lift pressure Plt temporarily changes. In such situation, when the first target torque calculation unit 31 calculates the first target torque Tm1 using the actual lift pressure Plt, the torque curve L may be switched. Consequently, sudden acceleration or insufficient acceleration of the forklift 1 may occur. To avoid such situation, the first target torque calculation unit 31 in the control device 30 carries out processing to moderate the change in the actual lift pressure Plt. Using the resulting processed value, the first target torque calculation unit 31 calculates the first target torque Tm1. The processing to moderate changes in the actual lift pressure Plt is performed by at least either of the filter 31A and the average processing unit 31B.

The filter 31A included in the first target torque calculation unit 31 provides an output delayed from an input by a first-order lag. Therefore, when the filter 31A receives the actual lift pressure Plt as an input, the filter 31A outputs the actual lift pressure Plt with a delay of a first-order lag as an output value Pltf. The first target torque calculation unit 31 thereby calculates the first target torque Tm1 using the output value Pltf obtained by suppressing steep changes in the actual lift pressure Plt through the processing in the filter 31A. In this manner, by reducing the chances of the torque curves L switching during calculation of the first target torque Tm1, the first target torque calculation unit 31 can suppress sudden acceleration or insufficient acceleration of the forklift 1.

The average processing unit 31B processes the output value Pltf from the filter 31A so that peak values which may occur in the actual lift pressure Plt are averaged, thereby suppressing steep changes in the actual lift pressure Plt. The first target torque calculation unit 31 uses at least either (both in the embodiment) of the filter 31A and the average processing unit 31B to moderate and suppress changes in the actual lift pressure Plt. In this manner, by reducing the chances of the torque curves L switching during calculation of the first target torque Tm1, the first target torque calculation unit 31 can suppress sudden acceleration or insufficient acceleration of the forklift 1.

(Second Target Torque Calculation Unit 32)

A second target torque calculation unit 32 includes a higher selecting unit 32A, a second torque decision unit 32B, and a second modulation unit 32C. The higher selecting unit 32A obtains a pressure Pa detected by the pressure sensor 47A and a pressure Pb detected by the pressure sensor 47B. Hereinafter, the pressure Pa detected by the pressure sensor 47A and the pressure Pb detected by the pressure sensor 47B will suitably be referred to as A-port pressure Pa and B-port pressure Pb, respectively. The higher selecting unit 32A compares the obtained A-port pressure Pa and the B-port pressure Pb to select the higher one which is then output to the second torque decision unit 32B.

Figure 5:
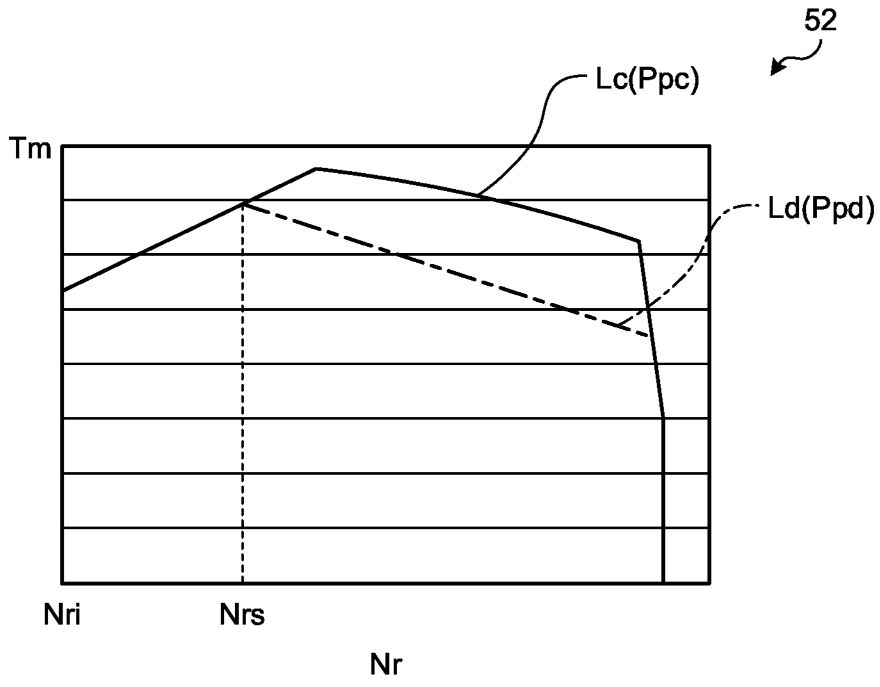
FIG. 5 illustrates a second torque selection map setting a torque curve representing the relation between the target torque of the engine and the actual engine rotational speed.

FIG. 5 illustrates a second torque selection map 52 setting a torque curve representing the relation between the target torque Tm of the engine 4 and the actual engine rotational speed Nr. The second torque selection map 52 sets a plurality of torque curves Lc and Ld. The torque curves Lc and Ld represent the relation between the rotational speed of the engine 4 (actual engine rotational speed Nr in the example) and the torque generated in the engine 4 (target torque Tm in the example). The torque curves La and Lb correspond to the output characteristic of the engine 4. The second torque selection map 52 includes the plurality of torque curves Lc and Ld. Hereinafter, the plurality of torque curves Lc and Ld, when not distinguished between each other, is referred to as torque curve L.

Each of the plurality of torque curves Lc and Ld is set to correspond to each of a plurality of pump pressures Ppc and Ppd. The pump pressures Ppc and Ppd are the pressure of working fluid discharged from the travel hydraulic pump 10 illustrated in FIG. 2, that is, the higher one of the A-port pressure Pa and the B-port pressure Pb. Hereinafter, the plurality of pump pressures Ppc and Ppd, when not distinguished between each other, will be referred to as pump pressure Pp.

The torque curve Lc corresponds to the pump pressure Ppc, and the torque curve Ld corresponds to the pump pressure Ppd which is lower than the pump pressure Ppc. As described above, the second torque selection map 52 corresponds to a second output characteristic group including a plurality of output characteristics of the engine 4, each output characteristic corresponding to each of the plurality of pump pressures Pp. The second torque selection map 52 is stored in the storage unit 30M in the control device 30 illustrated in FIG. 2. The second torque selection map 52 includes the two torque curves Lc and Ld, although the number of torque curves L may be two or more.

The torque curve Lc represents the relation between the maximum torque that the engine 4 can generate and the rotational speed of the engine 4. The engine 4 cannot generate a torque greater than that determined by the torque curve Lc. When the engine 4 is controlled according to the torque curve Ld, the maximum torque that the engine 4 can generate is limited by the torque curve Ld. From the idle rotational speed Nri to the rotational speed Nrs which is higher than the rotational speed Nri, the torque curve Ld is identical to the torque curve Lc. When the rotational speed is at Nrs or higher, the torque curve Ld limits the torque generated in the engine 4 to be smaller than the torque determined by the torque curve Lc for the same rotational speed. In the embodiment, the target torque Tm in the second torque selection map 52 is expressed in a value of ratio where the torque curve Lc represents the 100% value. That is, the target torque Tm decided by the second torque selection map 52 is output in percentage.

Based on the pump pressure Pp, the second torque decision unit 32B selects either of the torque curves Lc and Ld set in the second torque selection map 52 illustrated in FIG. 5. The second torque decision unit 32B then decides the target torque Tm from the selected torque curve L and the actual engine rotational speed Nr and outputs the determined result to the second modulation unit 32C as a second target torque Tm2. When there is no torque curve L corresponding to the pump pressure Pp, the second torque decision unit 32B calculates the target torque Tm corresponding to the pump pressure Ppd by interpolation using a value on the torque curve Lc corresponding to the pump pressure Ppc and a value on the torque curve Ld corresponding to the pump pressure Ppd. When the pump pressure Pp output from the higher selecting unit 32A is higher than the pump pressure Ppc corresponding to the torque curve Lc, the second torque decision unit 32B calculates the target torque Tm using the torque curve Lc. When the pump pressure Pp output from the higher selecting unit 32A is lower than the pump pressure Ppd corresponding to the torque curve Ld, the second torque decision unit 32B calculates the target torque Tm using the torque curve Ld.

When the target torque Tm of the engine 4 is decided only using the lift pressure, that is, only by the processing in the first target torque calculation unit 31, the torque generated in the engine 4 may be restricted when the forklift 1 is climbing up a slope with low lift pressure due to a light load on the fork 6. This may result in insufficient acceleration or drop in speed of the forklift 1 in a situation requiring greater torque in the engine 4. The same phenomenon may happen when a work machine 5 with load restriction is used. The second target torque calculation unit 32 calculates the second target torque Tm2 using the pump pressure Pp and the second torque selection map 52, that is, by using the torque curve Lc setting the maximum torque that the engine 4 can generate. In this manner, the control device 30 can drive the engine 4 with the maximum torque that the engine 4 can generate. Therefore, in a situation when a large power is required of the engine 4 such as when the forklift 1 with a light load on the fork 6 is climbing up a slope, insufficient acceleration and drop in speed of the forklift 1 can be suppressed.

Further, when the load of the forklift 1 is light, the first target torque Tm1 obtained in the first target torque calculation unit 31 may be smaller than the maximum torque that the engine 4 can generate. Therefore, when the target torque Tm of the engine 4 is decided only from the lift pressure, that is, by the processing in the first target torque calculation unit 31, the forklift 1 may fail to generate sufficient pushing force due to the limitation on torque in the engine 4 when the forklift 1 pushes a light weight load or when the forklift 1 tries to escape from a step. The second target torque calculation unit 32 calculates the second target torque Tm2 using the pump pressure Pp and the second torque selection map 52, that is, by using the torque curve Lc setting the maximum torque that the engine 4 can generate. In this manner, the control device 30 can drive the engine 4 with the maximum torque that the engine 4 can generate. This reduces the chances of lacking pushing force when the forklift 1 pushes a light weight load or lacking of driving force when the forklift 1 tries to escape from a step.

The second modulation unit 32C modulates the output from the second torque decision unit 32B and outputs the modulated result to the target torque decision unit 34. The second modulation unit 32C uses limit modulation. When the output from the second torque decision unit 32B increases, the second modulation unit 32C increases the output from the second torque decision unit 32B by pressure Ppi per a unit time tu. When the output from the second torque decision unit 32B decreases, the second modulation unit 32C decreases the output from the second torque decision unit 32B by pressure Ppd per a unit time tu. In the embodiment, the pressure Ppi is identical to the pressure Ppd. When the output from the second torque decision unit 32B does not increase nor does decrease, the second modulation unit 32C outputs the output sent from the second torque decision unit 32B to the target torque decision unit 34.

When the second target torque Tm2 is determined from the pump pressure Pp, the pump pressure Pp changes according to the change in torque in the engine 4. This may cause a phenomenon of fluctuation with a short period of cycle in the torque in the engine 4 and in the pump pressure Pp in the travel hydraulic pump 10. By the second modulation unit 32C modulating the output from the second torque decision unit 32B, such phenomenon can be suppressed.

(Third Target Torque Calculation Unit 33)

As illustrated in FIG. 3, the third target torque calculation unit 33 includes an overheating determination unit 33A, a third torque decision unit 33B, a selecting unit 33C, and a third modulation unit 33D. The overheating determination unit 33A determines whether the HST is overheating from a working fluid temperature θol in the HST detected by the temperature sensor 49. Hereinafter, the working fluid temperature θol in the HST is referred to as HST temperature θol as required.

Figure 6:
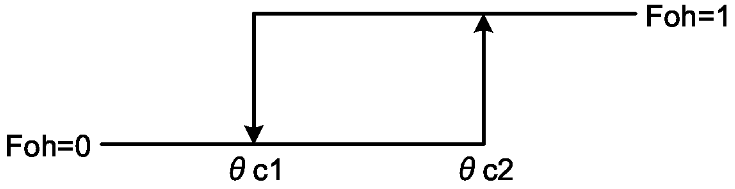
FIG. 6 illustrates a method for determining overheating by an overheating determination unit.

FIG. 6 illustrates a method for determining overheating by the overheating determination unit 33A. In a case when the HST temperature θcl is rising, the overheating determination unit 33A determines that the HST is overheating when the HST temperature θol exceeds a threshold which is a first temperature threshold θc1 in the embodiment. When it is determined that the HST is overheating, the overheating determination unit 33A sets an overheating flag Foh to "1" which is then output to the selecting unit 33C. In a case when the HST temperature θcl is decreasing, the overheating determination unit 33A determines that the HST is not overheating anymore when the HST temperature θol becomes lower than a second temperature threshold θc2 which is lower than the first temperature threshold θc1. When it is determined that the HST is not overheating anymore, the overheating determination unit 33A sets the overheating flag Foh to "0" which is then output to the selecting unit 33C. By frequently switching the overheating flag Foh between "1" and "0" according to determination made as described above, a phenomenon of the frequency of switching in the selecting unit 33C can be suppressed.

Figure 7:
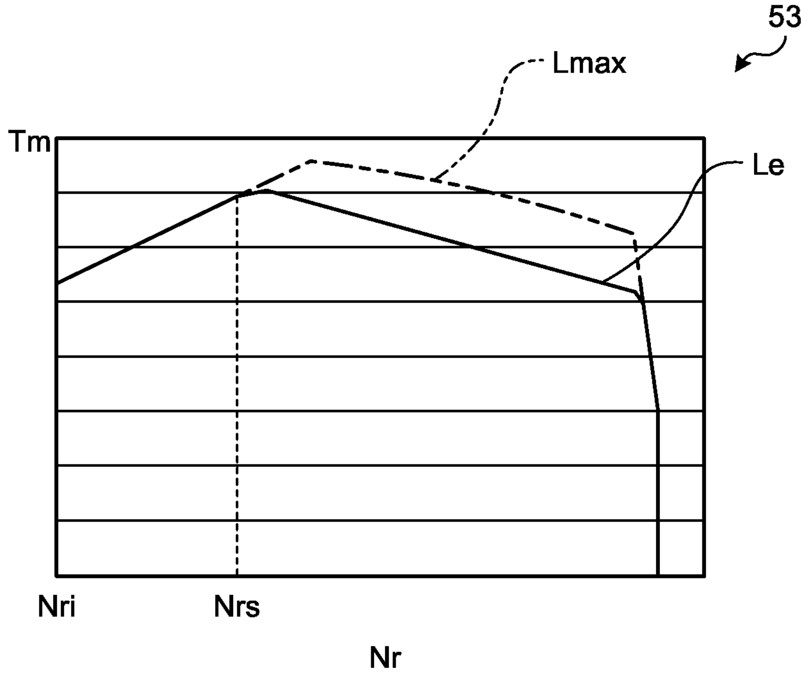
FIG. 7 illustrates a third torque selection map setting a torque curve representing the relation between the target torque of the engine and the actual engine rotational speed.

FIG. 7 illustrates a third torque selection map 53 setting a torque curve representing the relation between the target torque Tm of the engine 4 and the actual engine rotational speed Nr. The third torque selection map 53 is used to decide the target torque of the engine 4 when the HST is overheating. The third torque selection map 53 is stored in the storage unit 30M in the control device 30 illustrated in FIG. 2. The third torque selection map 53 sets a torque curve Le. The torque curve Le represents the relation between the rotational speed of the engine 4 (actual engine rotational speed Nr in the example) and the torque generated in the engine 4 (target torque Tm in the example). The torque curve Le corresponds to the output characteristic of the engine 4.

The torque curve Le includes a portion determining a torque smaller than a torque determined by a torque curve Lmax representing the relation between the maximum torque that the engine 4 can generate and the rotational speed of the engine 4. Specifically, from the idle rotational speed Nri to the rotational speed Nrs which is higher than the rotational speed Nri, the torque curve Le is identical to the torque curve Lmax. When the rotational speed is at Nrs or higher, the torque curve Le limits the torque generated in the engine 4 to be smaller than the torque determined by the torque curve Lmax for the same rotational speed. In the embodiment, the target torque Tm in the third torque selection map 53 is expressed in a value of ratio where the torque curve Lmax represents the 100% value. That is, the target torque Tm decided by the third torque selection map 53 is output in percentage. The third torque decision unit 33B decides the target torque Tm from the torque curve Le and the actual engine rotational speed Nr obtained by the engine speed sensor 43. The third torque decision unit 33B then outputs the target torque Tm to the selecting unit 33C as a target torque Tmh used for the state when the HST is overheating.

According to the value of the overheating flag Foh, the selecting unit 33C switches the target torque between the target torque Tmh used for the state when the HST is overheating and the target torque Tm used for the state when the HST is not overheating. The target torque Tmn for the state when the HST is not overheating is the target torque of 100%, that is, the target torque Tm decided by the torque curve Lmax. The selecting unit 33C outputs the target torque Tmh to the third modulation unit 33D when the overheating flag Foh is "1", and outputs the target torque Tmn to the third modulation unit 33D when the overheating flag Foh is "0".

The third modulation unit 33D modulates the output from the selecting unit 33C and outputs the modulated result to the target torque decision unit 34. The third modulation unit 33D uses limit modulation. When the output from the third modulation unit 33D increases, for example, when the target torque Tmh for the overheating state switches to the target torque Tmn for the non-overheating state, the third modulation unit 33D increases the output from the selecting unit 33C by torque Toi per a unit time tu. When the output from the selecting unit 33C decreases, for example, when the target torque Tmn for the non-overheating state switches to the target torque Tmh for the overheating state, the third modulation unit 33D decreases the output from the selecting unit 33C by torque Tod per a unit time tu. In the embodiment, the torque Toi is identical to the torque Tod. When the output from the selecting unit 33C does not increase nor does decrease, the third modulation unit 33D outputs the output sent from the selecting unit 33C to the target torque decision unit 34.

The embodiment is preferable in that the sudden change in torque in the engine 4, occurring when the target torque switches between the target torque Tmh for the overheating state and the target torque Tmn for the non-overheating state, can be suppressed by reducing both the torque Poi and the torque Pod used in limit modulation in the third modulation unit 33D.

(Target Torque Decision Unit 34)

The target torque decision unit 34 includes a greater selecting unit 34A and a smaller selecting unit 34B. The greater selecting unit 34A selects the greater one of the first target torque Tm1 calculated in the first target torque calculation unit 31 and the second target torque Tm2 calculated in the second target torque calculation unit 32, and outputs the selected one to the smaller selecting unit 34B. The smaller selecting unit 34B selects the smaller one of the output from the greater selecting unit 34A and the third target torque Tm3 calculated in the third target torque calculation unit 33, and determines the selected one as the target torque Tm of the engine 4.

When the HST is not overheating, the output from the greater selecting unit 34A is as large as, or smaller than, the third target torque Tm3, so that the target torque decision unit 34 determines the greater one of the first target torque Tm1 and the second target torque Tm2 as the target torque Tm of the engine 4. When the HST is overheating, the smaller one of the output from the greater selecting unit 34A and the third target torque Tm3 is determined as the target torque Tm of the engine 4, so that overheating of the HST can be suppressed.

In the embodiment, the processing unit 30C in the control device 30 includes the fuel injection amount calculation unit 35. The fuel injection amount calculation unit 35 calculates the amount of fuel injected in the engine 4 by a fuel injector 41 based on the accelerator position Aop detected by the accelerator potentiometer 41 and the actual engine rotational speed Nr detected by the engine speed sensor 43. The fuel injection amount calculation unit 35 obtains the target torque Tm from the torque decision unit 34 and calculates the fuel injection amount Qf injected by the fuel injector 41 to be within a range in which the maximum torque generated in the engine 4 does not exceed the target torque Tm. The fuel injection amount calculation unit 35 outputs a command value of the fuel injection amount Qf to the fuel injector 41. The fuel injector 41 injects fuel in the engine 4 by the amount corresponding to the fuel injection amount Qf output from the fuel injection amount calculation unit 35.

<Example of Control Carried Out by Method for Controlling Forklift According to the Embodiment>

The control device 30 carries out a method for controlling the forklift according to the embodiment to control the engine 4 during operation of the forklift 1. The first target torque calculation unit 31 in the control device 30 calculates the first target torque Tm1 from the lift pressure setting value, that is, the loading lift pressure Pr or the lift pressure reference value Pmt, or the actual lift pressure Plt detected by the pressure sensor 48. The second target torque calculation unit 32 calculates the second target torque Tm2 from the pump pressure Pp.

The third target torque calculation unit 33 decides overheating of the HST from the working fluid temperature θo1 in the HST. The third target torque calculation unit 33 decides the third target torque Tm3 according to whether the HST is overheating. By comparing the third target torque Tm3 and the greater one of the first target torque Tm1 and the second target torque Tm2, the target torque decision unit 34 determines the smaller one as the target torque Tm of the engine 4.

As described above, by comparing the greater one of, the first target torque Tm1 calculated using the lift pressure setting value or the actual lift pressure Plt and the second target torque Tm2 calculated using the pump pressure Pp, and the third target torque Tm3 calculated according to whether the HST is overheating, the control device 30 determines the smaller one as the target torque Tm of the engine 4. In this manner, the control device 30 calculates the target torque Tm of the engine 4 using the lift pressure setting value or the actual lift pressure Plt according to the load on the lift and, in addition, the pump pressure Pp corresponding to the load on the HST. For example, in a situation when a large driving force is required during traveling with a load, high torque is generated in the engine 4 to suppress insufficient acceleration or drop in speed which occurs when a greater torque is required of the engine 4.

The embodiment and the exemplary modification are not limited to those described above. The components include those which can easily be conceived by those skilled in the art, those substantially the same, and those within the scope, meaning, and range of equivalency.

Further, the components can suitably be used in combination. Furthermore, at least one of omission, substitution, and alteration of components can be made without departing from the spirit and the scope of the embodiment and the exemplary modification.

REFERENCE SIGNS LIST

1 forklift
4 engine
5 work machine
6 fork

7 lift cylinder
8 tilt cylinder
9 mechanical brake
10 travel hydraulic pump
10A A-port
10B B-port
11 pump capacity setting unit
14 pump capacity control cylinder
15 charge pump
16 work machine hydraulic pump
20 hydraulic motor
21 motor capacity setting unit
30 control device
30C processing unit
30M storage unit
31 first target torque calculation unit
31A filter
31B average processing unit
31C vehicle state determination unit
31D selecting unit
31E first modulation unit
31F lower selecting unit
31G first torque decision unit
32 second target torque calculation unit
32A higher selecting unit
32B second torque decision unit
32C second modulation unit
33 third target torque calculation unit
33A overheating determination unit
33B third torque decision unit
33C selecting unit
33D third modulation unit
34 target torque decision unit
34A greater selecting unit
34B smaller selecting unit
35 fuel injection amount calculation unit
40 inching potentiometer
41 accelerator potentiometer
42 forward/rearward travel lever switch
43 engine speed sensor
46 vehicle speed sensor
47A, 47B, 48 pressure sensor
51 first torque selection map
52 second torque selection map
53 third torque selection map
100 main hydraulic circuit
Aop accelerator position
L, La, Lb, Lc, Ld, Le, Lmax torque curve
Nr actual engine rotational speed
Pa, Pb port pressure
Pl, Pla, Plb lift pressure
Pr loading lift pressure
Plm heavy load traveling lift pressure
Pmt lift pressure reference value
Pp, Ppc, Ppd pump pressure
Tm, Tmh, Tmn target torque
Tm1 first target torque
Tm2 second target torque
Tm3 third target torque
θc1 first temperature threshold
θc2 second temperature threshold

The invention claimed is:

1. A forklift comprising:

an engine;

a travel hydraulic pump which is a variable displacement pump driven by the engine;

a hydraulic motor which forms a closed circuit with the travel hydraulic pump and is driven with working fluid discharged from the travel hydraulic pump;

a driving wheel driven by the hydraulic motor;

a lift pressure detecting device which detects lift pressure in a lift cylinder which raises or lowers a fork for mounting a load;

a pump pressure detecting device which detects a pump pressure that is a pressure of working fluid discharged from the travel hydraulic pump;

a storage unit which stores a first output characteristic group, a second output characteristic group, and a predetermined lift pressure setting value, the first output characteristic group including a plurality of output characteristics each of which represents a relation between a rotational speed of the engine and a torque generated in the engine for each of a plurality of lift pressures, the second output characteristic group including a plurality of output characteristics each of which represents a relation between the rotational speed and the torque for each of a plurality of pump pressures; and a control device which determines a greater one of a first target torque and a second target torque as a target torque of the engine, the first target torque being calculated from an output characteristic selected from the first output characteristic group, using the lift pressure setting value or an actual lift pressure detected by the lift pressure detecting device, and the rotational speed of the engine, the second target torque being calculated from an output characteristic selected from the second output characteristic group, using the pump pressure, and the rotational speed of the engine.

2. The forklift according to claim 1, wherein the control device selects an output characteristic from the first output characteristic group using a value obtained by processing the actual lift pressure to moderate changes in the actual lift pressure.

3. The forklift according to claim 1, wherein the control device determines, as the target torque of the engine, a greater one of the first target torque and a value obtained by modulating the second target torque.

4. The forklift according to claim 1, further comprising:

an accelerator operation unit which operates an amount of fuel supplied to the engine to increase or decrease;

a selecting switch which switches between forward travel and rearward travel of a forklift; and a brake operation unit which performs braking of the forklift, wherein the storage unit stores at least two lift pressure setting values, the control device detects each controlling state of the selecting switch, the brake operation unit, and the accelerator operation unit to determine whether the forklift is in a loading operation state, the control device then selects a higher one from the at least two lift pressure setting values when a state is determined as the loading operation state, or selects a lower one from the at least two lift pressure setting values when a state is not determined as the loading operation state, and the control device then selects the output characteristic from the first output characteristic group using a lower one of the selected lift pressure setting value and the actual lift pressure.

5. The forklift according to claim 1, wherein when a temperature of working fluid in the closed circuit exceeds a threshold value, the control device determines, as the target torque of the engine, a smaller one of both a third target torque and a greater one of both the first target torque and the second target torque, the third target torque being calculated by applying the rotational speed of the engine to an output characteristic including a portion which determines a torque smaller than a torque determined by an output characteristic representing a relation between the rotational speed of the engine and a maximum torque generated in the engine.

6. A method for controlling a forklift, the forklift including an engine, a travel hydraulic pump which is a variable displacement pump driven by the engine, a hydraulic motor which forms a closed circuit with the travel hydraulic pump and is driven with working fluid discharged from the travel hydraulic pump, a driving wheel driven by the hydraulic motor, a lift pressure detecting device which detects lift pressure in a lift cylinder which raises or lowers a fork for mounting a load, and a pump pressure detecting device which detects a pump pressure that is a pressure of working fluid discharged from the travel hydraulic pump, the method comprising:

calculating a first target torque from an output characteristic and the rotational speed of the engine, the output characteristic being selected from a first output characteristic group using a predetermined lift pressure setting value or an actual lift pressure detected by the lift pressure detecting device, the first output characteristic group including a plurality of output characteristics each of which represents a relation between the rotational speed of the engine and a torque generated in the engine for each of a plurality of lift pressures;

calculating a second target torque from an output characteristic and the rotational speed of the engine, the output characteristic being selected from a second output characteristic group using the pump pressure, the second output characteristic group including a plurality of output characteristics each of which represents a relation between the rotational speed and the torque for each of a plurality of pump pressures; and determining a greater one of the first target torque and the second target torque as a target torque of the engine.

* * * * *